INVENTOR.
FREDERICK TEPPER

United States Patent Office
3,627,478
Patented Dec. 14, 1971

3,627,478
METHOD FOR SEPARATING CARBON DIOXIDE FROM OTHER GASES
Frederick Tepper, Butler, Pa., assignor to Mine Safety Appliances Company, Pittsburgh, Pa.
Filed Aug. 12, 1969, Ser. No. 849,319
Int. Cl. B01d 53/00, 53/14
U.S. Cl. 23—2     11 Claims

ABSTRACT OF THE DISCLOSURE

Carbon dioxide is separated from gas mixtures by absorption at a high carbon dioxide partial pressure on a weak base ion exchange resin and subsequent desorption of the carbon dioxide from the resin by reducing the carbon dioxide partial pressure.

---

This invention relates to the separation of carbon dioxide from other gases and more particularly to a method in which carbon dioxide is cyclically absorbed on and desorbed from a weak base ion exchange resin by adjusting the carbon dioxide partial pressure of the gas in contact with the resin.

Carbon dioxide is separated from gas mixtures in the manufacture of carbon dioxide, as in absorption from flue gases resulting from burning of carbonaceous materials, as well as in a variety of situations in which the primary purpose of the separation is to remove carbon dioxide from a desired product gas. Thus carbon dioxide is removed from process gases or synthesis gas in steam-hydrocarbon reforming methods of producing hydrogen, ammonia and methanol. Carbon dioxide is also removed from gaseous air-hydrocarbon combustion products to produce oxygen-free inert gas atmospheres, for example, in providing inert atmospheres for fruit and produce storage.

It is an object of this invention to provide a method of separating carbon dioxide from other non-acid gases by cyclically absorbing and desorbing carbon dioxide on a solid absorbent by cyclically varying the carbon dioxide partial pressure. A further object is to provide such a method in which absorption and desorption can take place at substantially the same temperature, and further at normal ambient or room temperatures. A still further object is to provide such a method that is operable with gases containing water vapor, and especially high concentrations of water vapor up to saturation. Another object is to provide a method of generating an inert gas atmosphere by separating carbon dioxide from air-hydrocarbon combustion products. Other objects will be apparent from the following description and claims.

In accordance with this invention, a gas mixture containing carbon dioxide at a first partial pressure is contacted with a weak base ion exchange resin whereby carbon dioxide is absorbed by the resin; subsequently, the carbon dioxide partial pressure of the gas in contact with the absorbent is reduced to a second partial pressure whereby carbon dioxide is desorbed and the resin is regenerated for use again to absorb carbon dioxide at the first partial pressure. When the purpose of the gas separation is the recovery of carbon dioxide, it is preferred that the first partial pressure be a pressure above atmospheric pressure and the second partial pressure be a pressure substantially equal to atmospheric pressure. When the purpose of the separation is to remove carbon dioxide from a desired product gas, the first partial pressure may be atmospheric and the second partial pressure is preferably a pressure below atmospheric, as, for example, the carbon dioxide partial pressure in ordinary air at atmospheric pressure.

Figure 1:
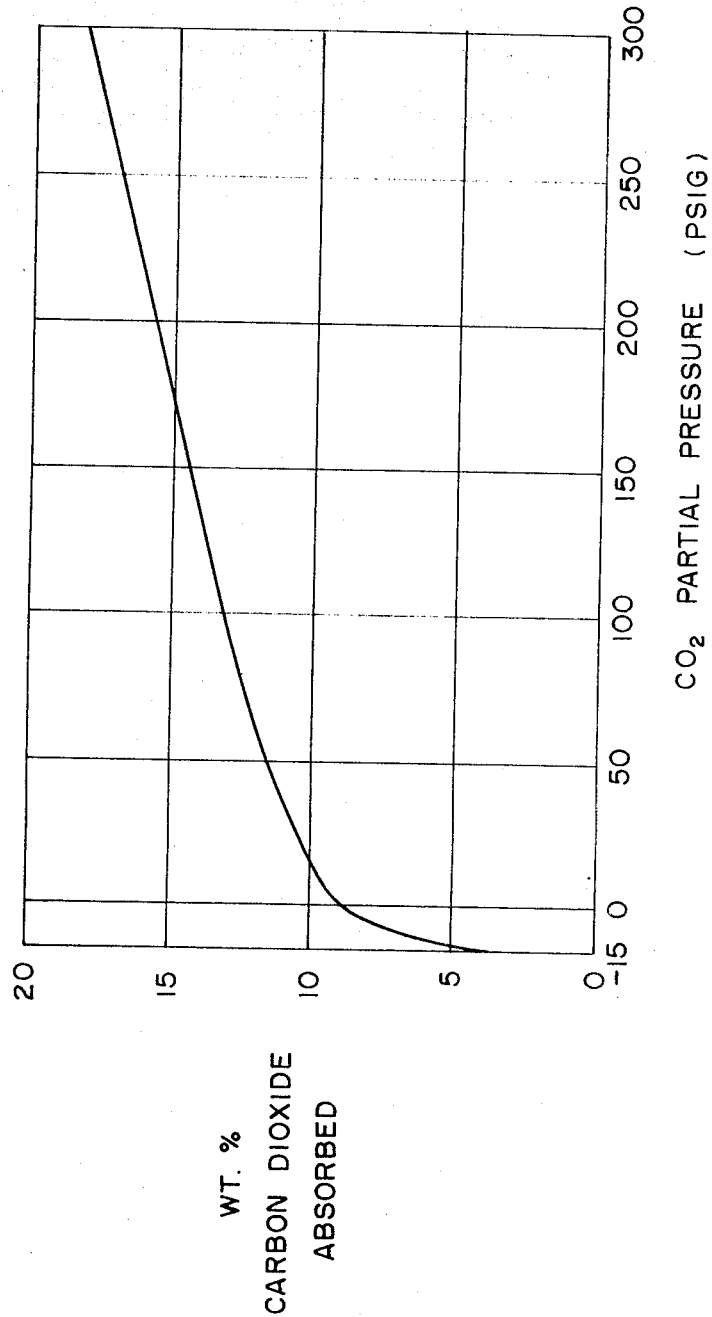
Figure 2:
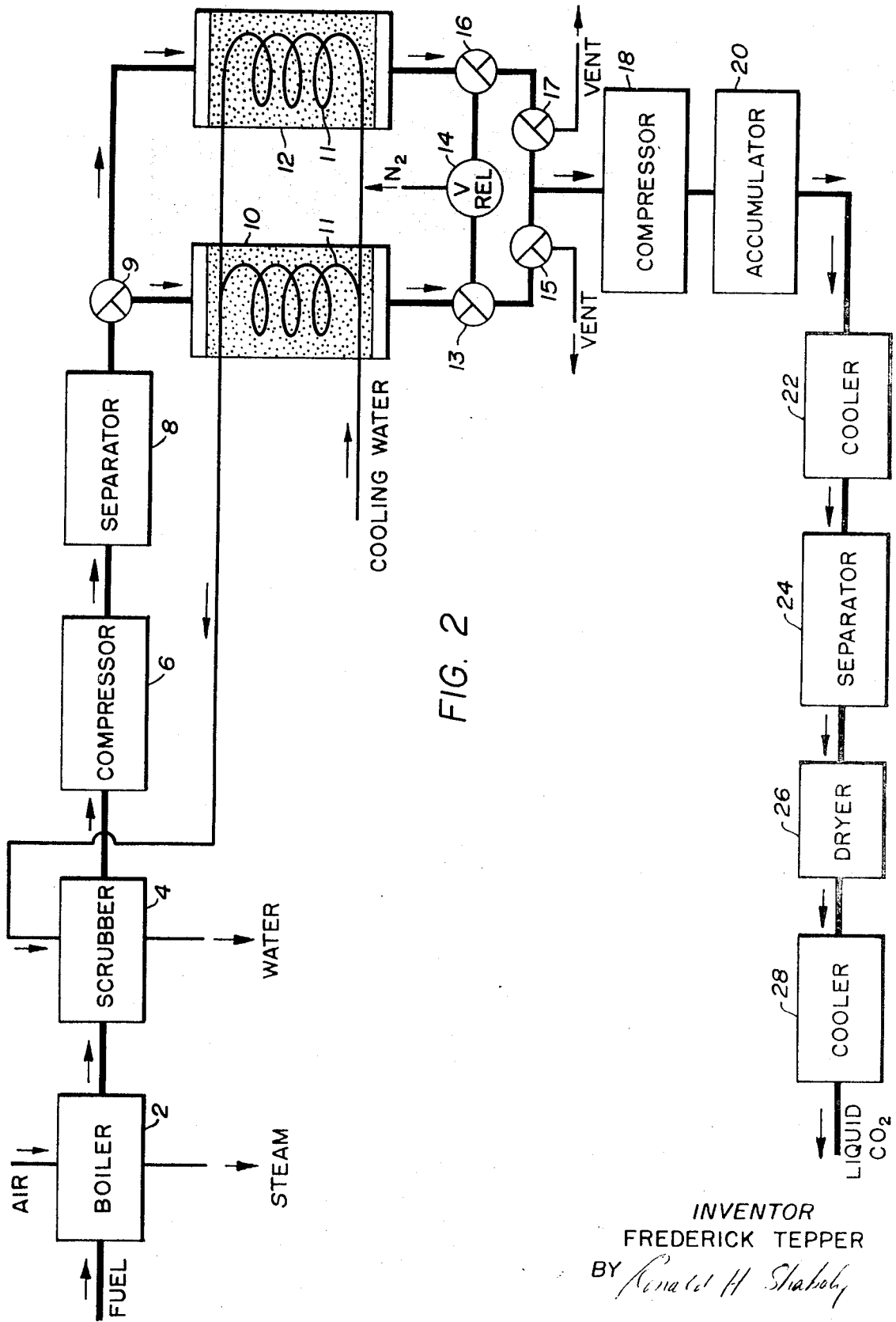
Figure 3:
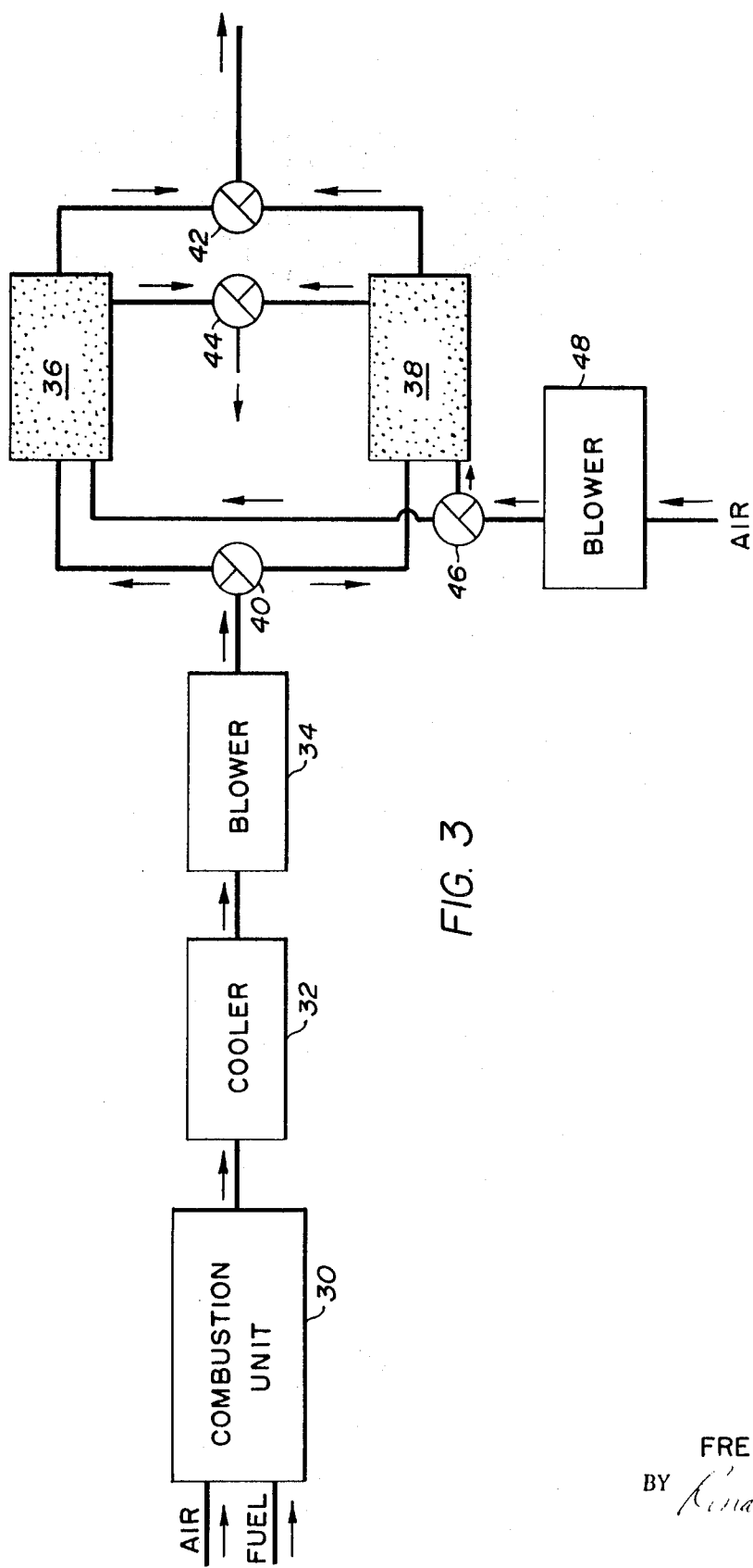

FIG. 1 is a chart showing the equilibrium carbon dioxide content of a typical weak base ion exchange resin at various carbon dioxide partial pressures;
FIG. 2 is a schematic flow diagram of a method of manufacturing carbon dioxide utilizing the gas separation method of this invention; and
FIG. 3 is a schematic flow diagram of a method of producing inert gas utilizing the gas separation method of this invention.

The method is suitable for separating carbon dioxide from gas mixtures containing air, inert gases such as helium, neon and argon, diatomic permanent gases such as hydrogen, oxygen and nitrogen, gaseous products of combustion, and other non-acid gases that are not absorbed by the weak base ion exchange resins. Gas mixtures containing acid gases such as sulfur oxides in flue gases, can be pretreated by conventional methods to remove the acid gas prior to their introduction to the carbon dioxide separation process.

ABSORBENTS

Weak base ion exchange resins are generally suitable for use as an absorbent in the practice of this invention. Such resins have primary, secondary or tertiary amine functionally active groups attached to a polymeric matrix. The polymeric materix may conventionally be polystyrene, polystyrene-divinylbenzene copolymer, phenol-formaldehyde, polyacrylic acid, polymethacrylic acid-divinylbenzene copolymer, or an epoxide type polymer. A large number of such resins are commercially available and are useable in this invention, with varying degrees of suitability.

Preferred weak base ion exchange resins, that have an especially high affinity and capacity for carbon dioxide and may be repeatedly regenerated without substantial impairment of absorption characteristics, include those resins in which the active group has polyamine functionality and contains at least one secondary amine nitrogen. Such materials are prepared by the formation of addition or condensation polymers with polyfunctional amines having a secondary amine nitrogen such as, for example, diethylenetriamine, triethylenetetramine and tetraethylenepentamine. Such preferred resins include polyacrylic acid-polyamine resins prepared according to U.S. Pat. 2,582,194 and epoxide-polyamine resins that are conventionally prepared by reaction of an epoxide resin and a polyamine in a solvent such as xylene.

Polystyrene-divinylbenzene copolymer gel type resins having polyamine functional groups are especially preferred absorbents. Resins of this type may be prepared by reaction of chloromethylated styrene-divinylbenzene copolymer with an amine such as diethylenetriamine, triethylenetetramine, tetraethylenepentamine and other polyfunctional amines. An equimolar, or in excess thereof, amount of amine for each chloromethyl group forms condensation of one chloromethyl group with one amine group as illustrated by the reaction using diethylenetriamine:

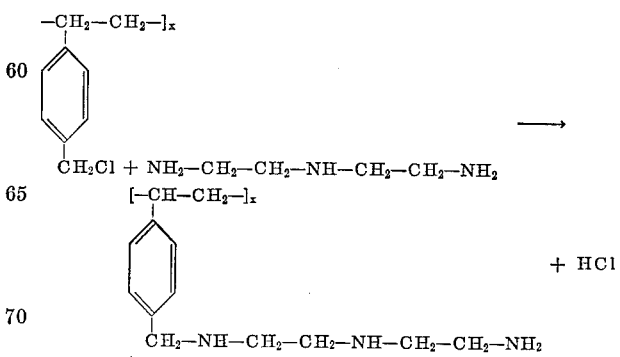

If the proportion of amine is about one-half of equimolar, condensation providing additional crosslinking and predominantly secondary amine functionality according to the following equation is favored:

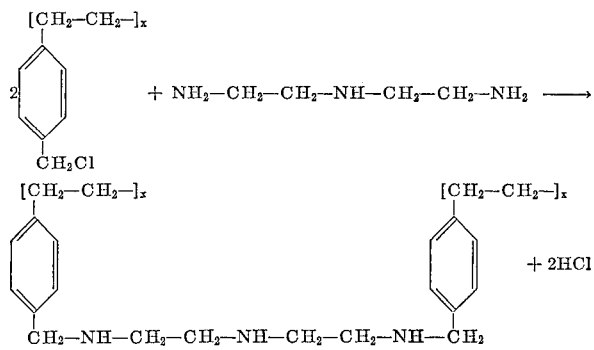

The carbon dioxide capacity of this type resin is correlative to the ion exchange capacity and conventional methods of improving ion exchange capacity also improves the dynamic carbon dioxide capacity. Thus, for example, to provide suitable porosity it is generally preferred to use copolymers containing less than about 10% divinylbenzene, suitably 3–5%. Amberlite IR–45, a chloromethylated polystyrene-divinylbenzene copolymer aminated with diethylenetriamine, is a typical commercially available resin of the preferred type.

The resins to be effective in absorbing carbon dioxide contain absorbed water, suitably above about a 5% water content; preferably the resin is not wet with unabsorbed water, which hinders carbon dioxide absorption. The capacity of various resins differs somewhat but generally a water content of below about 30% is substantially entirely absorbed water. The humidity of the gas being passed through the resin bed is adjusted, if necessary, to provide a suitable equilibrium water content in the resin. At 75° F., for example, a gas with a relative humidity of 50% will equilibrate at about 5–10 wt. percent water in the resin, while a gas with 90% relative humidity will equilibrate with a 25–30% resin water content. It is generally preferred to use a gas having a relative humidity above about 75%.

FIG. 1 shows the equilibrium carbon dioxide capacity of Amberlite IR–45 ion exchange resin at room temperature (70° F.). By comparing the carbon dioxide capacity at any two carbon dioxide partial pressures, the regenerable carbon dioxide capacity of an absorbent bed can be determined. For example, if a combusted fuel-air mixture cooled to room temperature containing 15% carbon dioxide is isothermically compressed to a total pressure of 250 p.s.i.g., the partial pressure of carbon dioxide is 37.5 p.s.i.g. When the gas mixture at this pressure is contacted with the absorbent bed, the carbon dioxide capacity from FIG. 1 is 10.7% by weight; that is, 10.7 pounds of carbon dioxide are absorbed by each 100 pounds of resin. If the pressure in the absorbent bed is vented, carbon dioxide is desorbed giving an atmosphere of substantially only carbon dioxide in contact with the bed; when vented down to atmospheric pressure (0 p.s.i.g.) the carbon dioxide capacity is 8.7%, giving a regenerable capacity of 2.0%. Under these conditions the absorbent bed can thus separate 2 pounds of carbon dioxide per 100 pounds of resin per cycle. If after venting to atmospheric pressure the bed is flushed with ordinary air, that normally contains only about 0.03% carbon dioxide, the equilibrium capacity of the resin is 3.3%, for a regenerable capacity of 7.4%.

The other absorbents above described show a similar relationship of carbon dioxide partial pressure and carbon dioxide capacity to provide a practical regenerable carbon dioxide capacity. The effect of carbon dioxide partial pressure on capacity is similar at temperatures other than room temperatures at which the absorbents are functional, that is, above the freezing point of water and below temperatures of about 100° F. It is preferred to use temperatures between about 40° F. and 90° F. The regenerable capacity for a given pressure spread are generally somewhat lower at temperatures above room temperature and somewhat higher at temperatures below room temperature.

FIG. 2 shows a carbon dioxide generating system incorporating my carbon dioxide separation method that is described in detail as sized to produce 300 pounds per hour of liquid carbon dioxide. Desulfurized liquid or gaseous fuel at a rate of 114 pounds per hour is combusted and steam is generated in a water tube boiler 2. The cooled combustion products are water washed in scrubber 4 and compressed to 500 p.s.i. by a 3-stage steam driven compressor 6. Excess water is removed by condenser separator 8. The gas stream effluent from the separator contains about 18% carbon dioxide in nitrogen and is saturated with water vapor. Resin beds 10 and 12, each 10 feet long, 4 feet in diameter and containing 1200 pounds of Amberlite IR–45 resin, are parallel connected so that one bed can be used in an absorption cycle while the other bed is in a regeneration-desorption cycle. The operation of the system will be described with reference to resin bed 10. Three-way valve 9 is adjusted to pass the gas stream through the resin bed 10 and valve 13 is adjusted to discharge the bed effluent through relief valve 14 that maintains a back pressure of slightly less than 500 p.s.i.g.; the carbon dioxide is absorbed and nitrogen is dumped at about 220 s.c.f.m. Heat of absorption is removed by water cooled coils 11 in the resin bed. After a predetermined time, valve 9 is adjusted to stop the flow through bed 10 and direct it through bed 12 in a similar absorption cycle and three-way valves 13 and 15 are adjusted to vent to the atmosphere. Nitrogen retained in the free space of the bed 10 continues to vent until carbon dioxide, desorbed because of the lowering partial pressure, begins to appear in the bed effluent. Valve 15 is then adjusted to direct the effluent carbon dioxide to the inlet of compressor 18; the resin bed on the suction side of the compressor is reduced to atmospheric pressure or less and the compressor discharges carbon dioxide and water vapor at 200 p.s.i. to accumulator 20. The carbon dioxide at 220 p.s.i. is passed through a cooler 22 where it is cooled to 40–80° F., a water separator 24 and silica gel dryer 26 to remove water, and is then cooled by refrigeration unit 28 to discharge 300 pounds per hour of liquid carbon dioxide. All the elements downstream of the resin bed, that is, from the compressor to the liquid carbon dioxide discharge, are conventionally used in systems using liquid absorbents for carbon dioxide. When bed 10 is in an absorption cycle, valves 16 and 17 are operated in the same manner as above described for valves 13 and 15, for regeneration of bed 12.

FIG. 3 schematically illustrates a simple and economical inert gas generation system for the manufacture of oxygen- and carbon dioxide-free atmospheres for use in fruit and produce storage. Air and a sulfur-free fuel, such as natural gas, are catalytically combusted in combustion unit 30 and cooled in cooler 32 according to conventional practice to provide a water saturated mixture of nitrogen and about 15–18% carbon dioxide. Blower 34 needs to provide only sufficient pressure to force the gas through a parallel connected resin bed 36 or 38 of Amberlite IR–45 resin. Three-way valve 40 is adjusted to direct the flow from the blower through resin bed 36, whereby carbon dioxide is absorbed, and the effluent nitrogen is directed through three-way valve 42 for use in a fruit storage chamber. The partial pressure of carbon dioxide in the stream entering the absorbent bed is about 2.25 p.s.i. and the resin bed will absorb about 5.2% by weight of carbon dioxide. Valves 40 and 42 are then adjusted to use bed 38 in the absorption cycle and valve 44 is adjusted to vent bed 36 to the atmosphere. Valve 46 is adjusted to direct ordinary ambient air, having a carbon dioxide partial pressure of only about 0.23 mm. Hg, from the blower 48 through the bed to desorb carbon dioxide and regenerates the resin. After air flushing, the resin will contain about 3.3% carbon dioxide, giving a regenerable carbon dioxide capacity of 1.9 per hundred pounds of resin per cycle. This system is simple and direct, operates at total pressures of about one atmosphere and at ambient temperatures, and is regenerable with ordinary air. Higher regenerable absorption capacity can be obtained, if desired, by using a compressor in place of blower 34.

I claim:

1. A method of separating carbon dioxide from mixtures with non-acid gases comprising the steps of contacting said gas mixture at a first carbon dioxide partial pressure and a weak base ion exchange resin having polyamine functionality and at least one secondary amine nitrogen, whereby carbon dioxide is sorbed by said resin, and reducing the carbon dioxide partial pressure of the gas in contact with said resin to a second partial pressure whereby carbon dioxide is desorbed from said resin.

2. A method according to claim 1 in which the first partial pressure is superatmospheric.

3. A method according to claim 1 in which the second partial pressure is subatmospheric.

4. A method according to claim 1 in which polymeric matrix of said resin is a polystyrene-divinylbenzene copolymer.

5. A method according to claim 1 in which the gas mixture is at a temperature between about 40° F. and 90° F. and has a relative humidity of at least about 75%.

6. A method according to claim 5 in which resin is a polystyrene-divinylbenzene gel type with polyamine functional groups having at least one secondary amine nitrogen.

7. A method of generating an inert gas comprising the steps of combusting a fuel and air mixture to form a combustion gas consisting essentially of nitrogen, carbon dioxide and water, passing said combustion gas at pressure at least about atmospheric pressure through a bed of weak base ion exchange resin having polyamine functionality and at least one secondary amine nitrogen, whereby carbon dioxide is absorbed, and recovering the inert gas effluent from said bed; stopping the flow of combustion gases through said bed and passing air through said bed to desorb carbon dioxide therefrom.

8. A method according to claim 7 in which the pressure is substantially atmospheric.

9. A method according to claim 7 in which the resin is a polystyrene-divinylbenzene gel type with polyamine functional groups having at least one secondary amine nitrogen.

10. A method according to claim 9 in which the polyamine is diethylenetriamine.

11. A method according to cloim 6 in which the polyamine is diethylenetriamine.

References Cited

UNITED STATES PATENTS

| | | | |
|---|---|---|---|
| 2,635,039 | 4/1953 | Peters | 23—220 X |
| 3,466,138 | 9/1969 | Spiegler et al. | 23—2 |
| 3,498,026 | 3/1970 | Messinger et al. | 55—73 |

EARL C. THOMAS, Primary Examiner

U.S. Cl. X.R.

23—150, 220